Feb. 19, 1929.
J. B. FREYSINGER
1,702,999
GARMENT SUPRORTER
Filed June 2, 1926
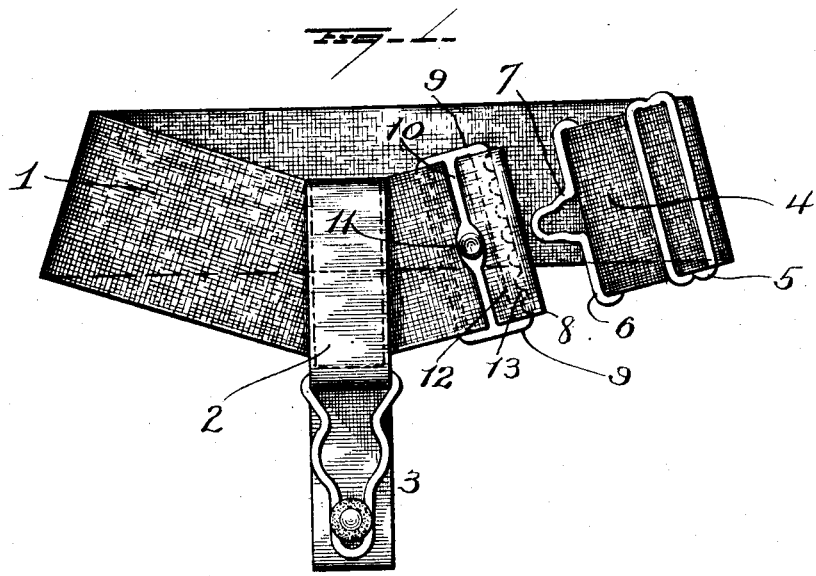
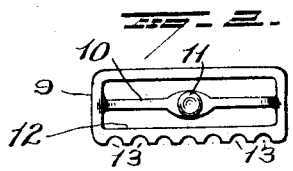
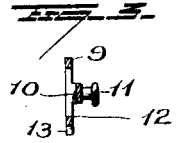
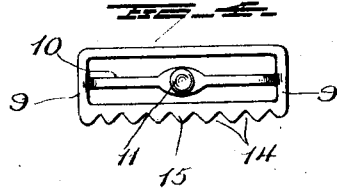
Inventor
J. B. Freysinger
By Seymour & Bright
Attorneys Patented Feb. 19, 1929.

1,702,999

UNITED STATES PATENT OFFICE.

JOHN B. FREYSINGER, OF NEW BRITAIN, CONNECTICUT, ASSIGNOR TO NORTH & JUDD MANUFACTURING COMPANY, OF NEW BRITAIN, CONNECTICUT.

GARMENT SUPPORTER.

Application filed June 2, 1926. Serial No. 113,254.

This invention relates to improvements in garment supporters and has particular reference to the construction of the stud frame of a garter.

In the construction of garters, particularly those of the limb-encircling type in which elastic webbing is employed, there is liability of lateral or angular pull at the connection between the ends of the garter. The connecting means for the ends of the garter usually comprise a stud carried by a frame attached to one end portion of the garter and a cast-off carried by the other end portion of the garter and engaging the stud under tension exerted by the elastic band. It has been found that with stud frames as heretofore constructed, lateral or angular pull, due to the elasticity of the webbing, has caused the loop of the webbing to slide out of proper position and to crowd toward one end of the stud frame. The object of my present invention is to maintain the loop and the stud frame always in proper relation to each other, notwithstanding the lateral or angular pull to which the stud frame may be subjected.

With this object in view, the invention consists in a certain novel structure as hereinafter set forth and pointed out in the claim.

In the accompanying drawings,—

Figure 1 is a view of a garter showing an application of my improvements thereto.

Figure 2 is a detail face view of the stud frame and stud.

Figure 3 is a sectional view of the device shown in Figure 2, and

Figure 4 is a view showing a slight modification of the stud frame.

In the drawings, the elastic webbing of a garter is illustrated at 1 and carries a loop 2 with which an attaching device 3 is connected. One end portion of the webbing 1 is formed into a loop 4 which is adjustable by a slide 5 and this loop carries a cast-off 6 having an intermediate loop portion 7.

The other end of the garter webbing is formed into a loop 8 which receives a stud frame 9,—the cross-bar 10 of said stud frame extending across the looped portion 8 of the webbing (exteriorly thereof) and carrying a stud 11 to receive the loop 7 of the cast-off 6. The forward cross-bar 12 of the stud frame 9 is notched at its outer edge portion. The notches in the outer edge portion of the stud frame bar 12 may be made curved as indicated at 13, Figure 2, or these notches may be made V-shaped, as indicated at 14, Figure 4, so as to form a plurality of blunt projections 15.

It will be apparent that with my improved construction, lateral or angular pull on the stud frame by the webbing may be exerted without liability of the frame and webbing sliding relatively to each other and the crowding of the webbing toward one end of the stud frame, because the webbing at the bight of the loop 8 will enter the recesses 13 (or 14) in the forward edge of the cross-bar 12 of the stud frame and thus be prevented from lateral movement relatively to the stud frame. It is to be noted that the stud frame is flat and that the portions between the notches lie entirely within the plane of the frame so that the webbing is not caused to form heavy folds which cause it to deteriorate. Moreover, the construction is not such as to form sharp spaced prongs which penetrate the fabric and cut the threads thereof but is rather a corrugated friction surface which prevents edgewise slipping of the webbing without biting into it.

Having fully described my invention what I claim as new and desire to secure by Letters-Patent, is:

A stud frame for garters comprising side bars, end bars, a stud bar connecting the end bars, and a stud projecting from the stud bar, one side bar being provided on its outer edge with notches and intervening blunt projections to engage and hold the garter fabric without penetrating the same.

In testimony whereof, I have signed this specification.

JOHN B. FREYSINGER.